July 27, 1943.    H. P. GUIRL ET AL    2,325,507
PROJECTION WELDING MACHINE
Filed March 31, 1942    2 Sheets-Sheet 2
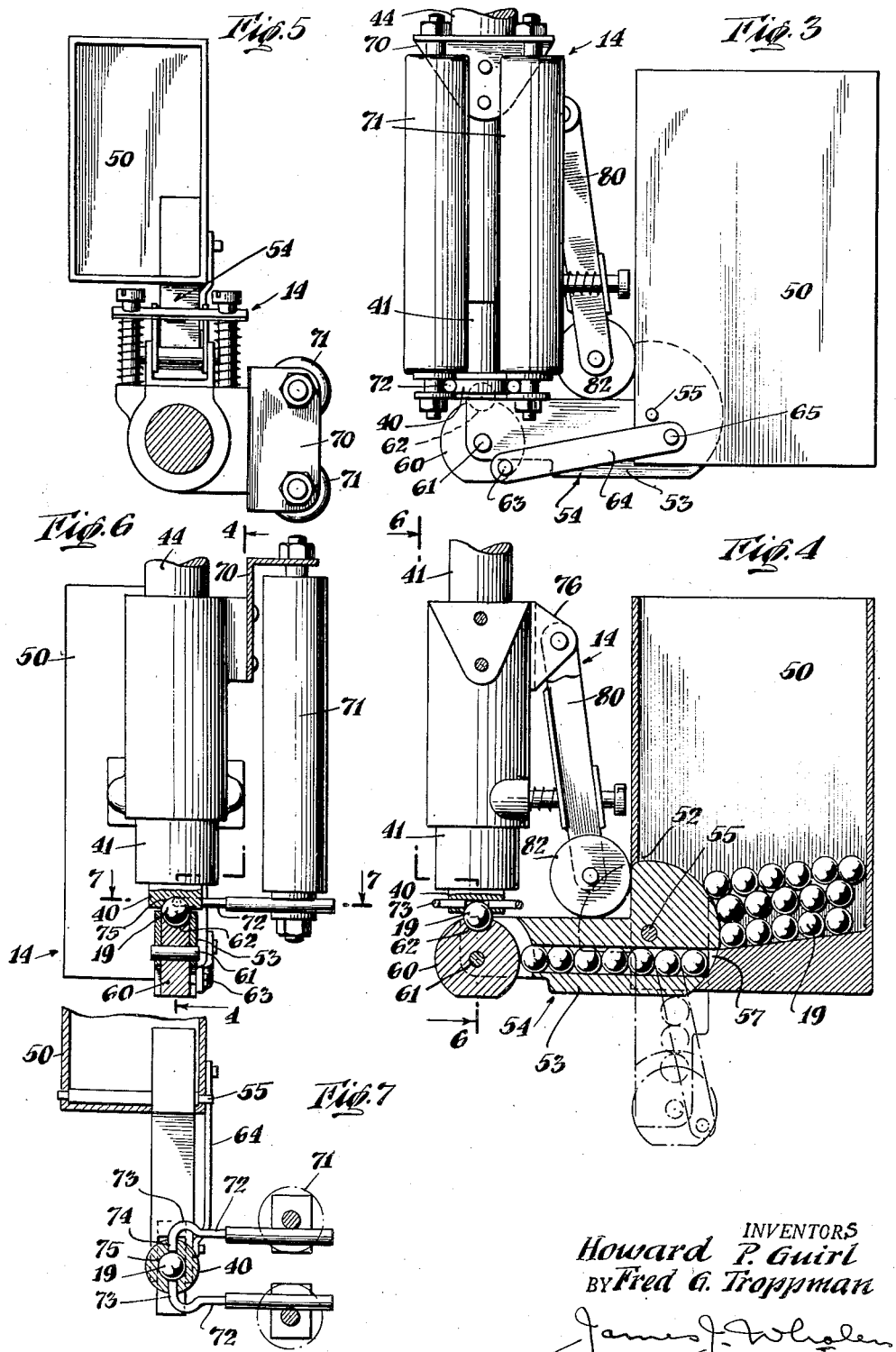
INVENTORS
Howard P. Guirl
BY Fred G. Troppman
ATTORNEY Patented July 27, 1943

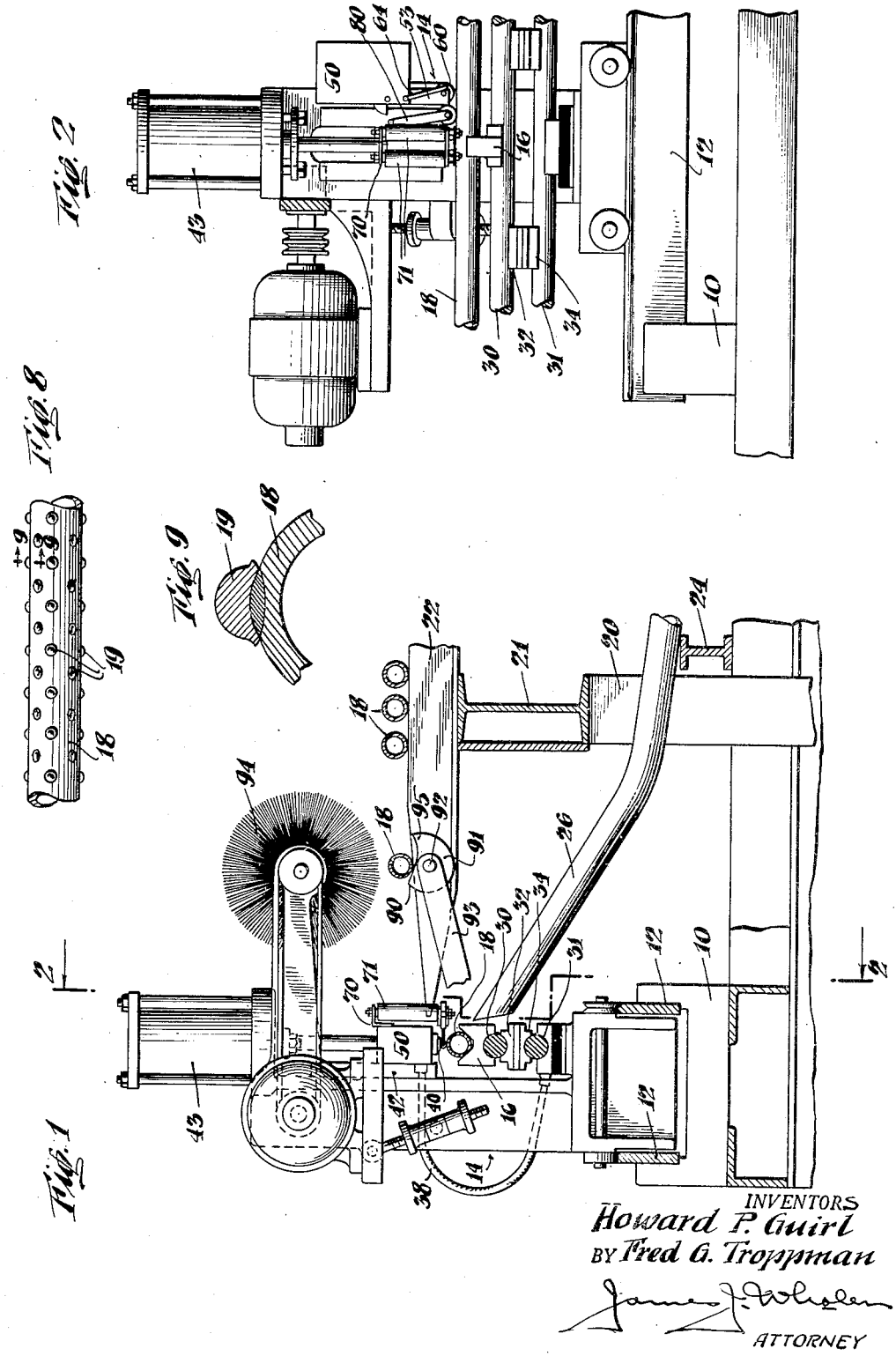

2,325,507

UNITED STATES PATENT OFFICE 2,325,507

PROJECTION WELDING MACHINE

Howard P. Guirl, East Chicago, Ind., and Fred G. Troppman, Lansing, Ill., assignors to The Superheater Company, New York, N. Y.

Application March 31, 1942, Serial No. 436,994

5 Claims. (Cl. 219—4)

The present invention relates to an improved heat transfer tube having projections welded thereto and to apparatus for welding the projections to the tubes.

The invention contemplates an improved heat transfer tube having extended surface in the form of a plurality of projections welded thereto, these projections being produced by a process of electrically resistance welding spherical balls or the like to the tube surface. Alternatively to serving as extended surface for heat transfer tubes, one or more projections welded to the latter in accordance with the present invention may constitute stops for positioning a supporting band or the like axially of the tube. In addition to a heat transfer tube having a novel form of extended surface, the invention includes apparatus for automatically welding the projections to a tube.

Figure 1 is an end elevational view of welding apparatus embodying the present invention;

Figure 2 is a fragmentary front elevational view, partly in section as viewed on the line 2—2 in Fig. 1;

Figure 3 is a front elevational view on an enlarged scale of the movable welding electrode and associated apparatus for feeding thereto articles to be welded to a work-piece;

Figure 4 is a view similar to Fig. 3 with some parts omitted and others shown in section as viewed along the line 4—4 in Fig. 6.

Figure 5 is a plan view corresponding to Fig. 3.

Figure 6 is a sectional view on the line 6—6 in Fig. 4.

Figure 7 is a sectional view on the line 7—7 in Fig. 6.

Figure 8 is a view of a section of heat transfer tubing having balls welded thereto to increase its heat absorbing area in accordance with the invention; and Figure 9 is an enlarged section through the weld joint between one of the balls and the tube wall.

Referring to Figs. 1 and 2; the welding machine has a framework 10 supporting parallel tracks 12 along which are positioned several movable welding carriages 14 of which only one is shown. On each welding carriage 14 is a support 16 for holding a work-piece; in the present instance this is a metallic block having a V-shaped trough or groove in its upper face for receiving a tube 18 which is sustained on the supports 16 of several carriages stationed at intervals along the tracks 12. The frame 10 also includes uprights 20 near each end of the machine between which a beam extends for supporting spaced skids 22 along which the tubes 18 may be rolled to be received by the work supports 16 of several carriages 14. Other uprights 24 are provided for supporting spaced skids 26 along which the finished work-pieces are rolled away from the work supports 16.

Extending parallel to and above the tracks 12 are a pair of bus bars 30, 31 for supplying electrical current for the welding operation. As appears in Fig. 1, the under side of work support 16 is recessed to ride in contact with the upper bus bar 30. Between the bus bars 30, 31 are pairs of blocks 32, 34 separating the bus bars. Electrical current from bus bar 30 flows directly through the metallic work support 16 to the tube on which projections are to be welded. A cable 38 connected with bus bar 31 carries the current to the movable electrode or welding tip 40 mounted on the carriage 14. The metallic welding tip 40 is located at the lower end of a plunger 41 vertically reciprocable in a guide 42 on carriage 14 by a hydraulic cylinder 43. Thus the welding tip 40 may be moved to and from a position for establishing an electrical circuit through a work-piece on the work support 16.

Metallic balls are welded to a metallic tube to produce a tube having extended surface such as shown in (Fig. 8) the balls 19 being partially embedded (Fig. 9) in the tube and their exposed surfaces increasing the area of the tube capable of transferring heat as from a gas flowing over the tube to a liquid passing therethrough. On the welding machine the balls are contained in a supply hopper 50 supported at one side of the welding tip 40. On the side facing welding tip 40 the hopper 50 is formed with an opening 52 (Fig. 4) through which projects the longer arm 53 of an elbow-shaped feeding member 54 pivoted on a shaft 55 extending transversely of opening 52. The feeding member 54 has a bore 57 forming a ball chute ordinarily filled with balls taken from the supply in the hopper 50. At its outer end the longer arm 53 is bifurcated and supports a feed block 60 on a pin 61. Block 60 is provided with hemispherical cavity 62 on the upper part of its rim for holding one of the metallic balls. An eccentric pin 63 on the feed block 60 is connected by a link 64 to a pin 65 on the side wall of the hopper 50 as shown in Fig. 3, so that upon downward swinging movement of the magazine 54 the feed block 60 is restrained from turning in order to maintain cavity 62 at the top of the block. However, the swinging of magazine 54 produces relative movement between block 60 and the arm 53 so that the outer end of the bore 57 in the arm becomes alined with the cavity 62 in block 60 to feed a ball thereto.

Supported adjacent the welding tip 40 by a bracket 70 are a pair of electromagnet coils 71 whose cores have metallic extensions 72 projecting toward the welding tip 40 with their end portions 73 (Fig. 7) bent towards each other and spaced apart a distance corresponding substantially to the diameter of the balls that are to be welded to the tube. When a current is passed through coils 71 a ball will be held between the points 73 at the end of the welding tip.

In the construction shown the bent ends 73 of the electrodes extend into diametrically alined bores extending to a hemispherical cavity 75 in the end of weld tip 40 so that a ball 19 may be retained on the end of the weld tip in contact with the metal thereof.

Pivotally attached to a bracket 76 mounted on the welding electrode 40 is an arm 80 carrying a roller 82 adapted on downward movement of the electrode to engage the long arm 53 of the feeding magazine 54 to move it and the feed block 60 in a downward arc out of the way of the welding tip as indicated in Fig. 4. Upon upward movement of the welding tip 50 after the welding operation has been completed, the roller 82 engages the arm 53 of the magazine 54 thus rotating it clockwise during which movement a ball will be picked up from the mass in the hopper 50 since space has been left therefor in the bore 57 as a consequence of feeding a ball from the other end of the feed block. At the same time the arm 54 swings upwardly to bring the feed block 60 and the ball 19 carried thereby into position beneath the weld tip.

In operation, a tube 18 is rolled to the left (Fig. 1) along the skids 22 until it contacts a top surface 90 on a cam 91 mounted on a shaft 92 supported by spaced arms 93 projecting from the framework of the machine. While supported by the skids 22 and held in fixed position thereon by several cams 91 spaced along the length of the machine, the surface of the tube is cleaned down to bare metal by rotating a metallic brush 94 against its surface. As several brushes are provided the surface of the tube is cleaned completely circumferentially thereof at several axially spaced points corresponding to the welding stations at which the several carriages are located. When shaft 92 is rocked counterclockwise, as by a crank at one end, a portion 95 of each cam 91 engages the tube 18 and advances it along the skids 22 so that it may roll into position on the work supports 16 of several welding carriages stationed at intervals along the tracks 12. The welding electrodes 40 together with parts which reciprocate vertically therewith are in raised position at this time. At each welding station, i. e. at each point where a carriage 14 is positioned, a ball 19 is held in the recess 75 on the welding electrode 40 by the associated feed block 60. At the beginning of the welding operation, the electrical circuit of the magnets 71 is completed so that the tip 73 of the cores thereof become magnetized. When fluid is admitted to the hydraulic cylinders 43, the welding electrodes 40 are moved downwardly toward the tube 18 on the supports 16 of the various carriages. During downward movement of an electrode, the roller 82 engages the arm 53 of its ball magazine 54 moving it and the feed block 60 from beneath the welding tip 40 as previously described. Inasmuch as the tips 73 of the cores of the electromagnets are in a magnetic circuit the end of the welding tip becomes magnetized so that a ball is retained on the tip of each welding electrode 40 despite the recession of the feed block 60 from a position beneath the tip where it sustains the ball. Continued downward movement of the electrodes brings the balls 19 carried on the tips thereof into contact with the surface of the tube 18. Upon completion of the circuit in which the bus bars 30, 31 are included and continued application of pressure by the hydraulic cylinders 43, a ball 19 is resistance welded to the tube 18 at each welding station. As appears in Fig. 9 the application of pressure together with the fusing of the metal of the ball 19 and adjacent portion of the tube causes the ball to be deformed and flattened while it is at the same time intimately bonded to the tube by being in effect pressed into its surface.

In producing a tube such as shown in Fig. 8 having a large number of projections for providing an "extended surface," four or more welding carriages may be spaced at intervals of several feet along the welding machine. By simultaneous operation of the welding electrodes for each carriage a number of projections may be welded at intervals spaced axially of the tube. Then by turning the tube 18 on the support 16 of the various carriages another set of projections may be welded to the tube spaced a desired distance circumferentially of the tube from the first set. Further, by moving the carriages axially of the tube, other projections may be welded in between those previously applied so that the tube finally has a plurality of projections disposed in axially extending rows spaced circumferentially of the tube. To further increase the amount of extended surface, the projections in alternate rows may be staggered as shown in Fig. 8.

While extended surface in the form of fins or the like has often been provided heretofore on heat transfer tubes, the utilization of ball-like projections has several advantages. Extended surface in the form provided by these hemispherical projections is several times as effective per pound of material added to the tube than when used in the form of fins. This is because the area of the weld joints between the tube and hemispherical projection is so much greater compared with the area of the heating surface than with fins that heat is removed by the tube much more rapidly from ball surface than from fin surface. This results in a cooler surface on the projections and consequently greater heat transfer from a gas flowing over the tube to the extended surface thereof. Furthermore, there are many installations in which it is desirable to space tubes as closely as possible and use of extended surface in the form of fins involves an inherent limitation on the spacing that may be effected. Even where only the same amount of extended surface is provided by utilizing hemispherical projections as is the case with fins, it is apparent that since the projections extend only slightly from the surface of a tube it is possible to install more tubes in a limited space.

What we claim is:

1. In welding apparatus having a work support; an electrode spaced from said support, and means for moving said electrode toward said support to engage a metallic element against a metallic work piece on said support so that an electric current may be passed therethrough for welding them together; feeding means movable into a position between said electrode and support for interposing a metallic element between said electrode and said work piece; means responsive to the movement of said electrode toward said support for positioning said feeding means out of the path of said electrode; and means associated with said electrode for retaining a metallic element in position thereon to engage a work piece on said support upon retraction of said feeding means.

2. In welding apparatus having a work support; an electrode spaced from said support, and means for moving said electrode toward said support to engage a metallic element against a metallic work piece on said support so that an electric current may be passed therethrough for welding them together; a hopper containing a supply of metallic elements to be welded to a work piece on said support; feeding means movable into a position between said electrode and support for interposing a metallic element from said hopper between said electrode and said work piece; means responsive to the movement of said electrode toward said support for positioning said feeding means out of the path of said electrode; and means associated with said electrode for magnetically retaining a metallic element in position thereon to engage a work piece on said support upon retraction of said feeding means.

3. A welding electrode having a cavity at the working end thereof for receiving a metallic article to be welded to a work piece; a feed block having an article-carrying cavity in its rim at the top portion thereof; a magazine adjacent said electrode and having a bore forming a chute for supplying articles to said feed block; means supporting said feed block opposite the end of said electrode in position to align an article carried thereby in the cavity in said electrode; means for moving said electrode toward said feed block to engage a work-piece; means responsive to the movement of said electrode for retracting said feed block from opposite the end of said electrode; means for retaining on said electrode an article taken from said feed block upon retraction of the latter; and means operative upon retraction of said feed block for aligning the cavity therein with said chute to receive an article therefrom.

4. An electrode for welding a metallic article to a work piece; a feed block having an article-carrying cavity in its rim at the top portion thereof; an arm pivoted adjacent said electrode and extending opposite the end thereof; means attaching said feed block to said arm in a position to align the cavity thereof with the end of said electrode; means movable toward said workpiece with said electrode for engaging said arm to move it about its pivot in a direction to retract said feed block from the path of said electrode; and means for retaining on said electrode an article taken from said feed block upon retraction of the latter.

5. An electrode for welding a metallic article to a workpiece; a feed block having an article-carrying cavity in its rim at the top portion thereof; an arm pivoted adjacent said electrode and extending opposite the end thereof, said arm having a bore out of alignment with said cavity and forming a chute for supplying articles thereto; means attaching said feed block to said arm in position to align the cavity thereof with the end of said electrode, said means permitting relative movement between said arm and feed block; means for moving said arm about its pivot in a direction to retract said feed block from the path of said electrode; means for effecting relative displacement between said feed block and arm, upon said movement of the latter, for aligning the bore in said arm with the cavity in said block for feeding an article thereto; and means for retaining on said electrode an article taken from said feed block upon retraction of the latter.

HOWARD P. GUIRL.
FRED G. TROPPMAN.